United States Patent
Song et al.

(10) Patent No.: US 10,128,499 B2
(45) Date of Patent: Nov. 13, 2018

(54) POSITIVE ELECTRODE ACTIVE MATERIAL, PREPARING METHOD THEREOF, AND LITHIUM SECONDARY BATTERY INCLUDING POSITIVE ELECTRODE COMPRISING THE POSITIVE ELECTRODE ACTIVE MATERIAL

(71) Applicant: SAMSUNG SDI CO., LTD., Yongin-si, Gyeonggi-do (KR)

(72) Inventors: Yumi Song, Yongin-si (KR); Mingzi Hong, Yongin-si (KR); Gyuran Jeon, Yongin-si (KR); Dohyung Park, Yongin-si (KR); Minhan Kim, Yongin-si (KR); Joongho Moon, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/342,671

(22) Filed: Nov. 3, 2016

(65) Prior Publication Data
US 2017/0133672 A1    May 11, 2017

(30) Foreign Application Priority Data
Nov. 5, 2015 (KR) .......... 10-2015-0155275

(51) Int. Cl.
*H01M 4/36* (2006.01)
*H01M 4/525* (2010.01)
(Continued)

(52) U.S. Cl.
CPC ......... *H01M 4/366* (2013.01); *H01M 4/0471* (2013.01); *H01M 4/505* (2013.01); *H01M 4/525* (2013.01); *H01M 4/628* (2013.01); *H01M 10/0525* (2013.01); *H01M 10/4235* (2013.01); *H01M 2004/021* (2013.01); *H01M 2004/028* (2013.01); *H01M 2220/20* (2013.01)

(58) Field of Classification Search
CPC ........ H01M 4/36; H01M 4/366; H01M 4/525; H01M 4/505; H01M 4/62; H01M 4/628; H01M 4/04; H01M 4/0471; H01M 10/0525; H01M 10/42; H01M 10/4235
See application file for complete search history.

(56) References Cited

U.S. PATENT DOCUMENTS

2016/0156021 A1* 6/2016 Aihara .................. H01M 4/131
  429/304
2016/0156027 A1* 6/2016 Kim ...................... H01M 4/366
  429/223

FOREIGN PATENT DOCUMENTS

JP    2010-199078 A    9/2010
JP    2014-049309 A    3/2014
(Continued)

OTHER PUBLICATIONS

Thackeray, M.M. et al., ZrO2- and Li2ZrO3-stabilized spinel and layered electrodes for lithium batteries, Aug. 9, 2003, Electrochemistry Communications, 5, 752-758.*

(Continued)

*Primary Examiner* — Karie O'Neill Apicella
(74) *Attorney, Agent, or Firm* — Lee & Morse, P.C.

(57) ABSTRACT

A positive electrode active material includes a lithium composite oxide and a zirconium oxide coating layer and a lithium zirconium oxide coating layer that are in a form of sequential layers on the lithium composite oxide.

17 Claims, 11 Drawing Sheets

(51) Int. Cl.
*H01M 4/505* (2010.01)
*H01M 4/62* (2006.01)
*H01M 4/04* (2006.01)
*H01M 10/0525* (2010.01)
*H01M 10/42* (2006.01)
*H01M 4/02* (2006.01)

(56) References Cited

FOREIGN PATENT DOCUMENTS

| KR | 10-2005-0114516 A | 12/2005 |
| KR | 10-2006-0021252 A | 3/2006 |
| WO | WO 2005/119820 A1 | 12/2005 |

OTHER PUBLICATIONS

Ni, et al. "Improved Electrochemical Performance of Layered $LiNi_{0.4}Co_{0.2}Mn_{0.4}O_2$ Via $Li_2ZrO_3$ Coating" Electrochimica Acta 53 (2008) 3075-3083.

* cited by examiner

POSITIVE ELECTRODE ACTIVE MATERIAL, PREPARING METHOD THEREOF, AND LITHIUM SECONDARY BATTERY INCLUDING POSITIVE ELECTRODE COMPRISING THE POSITIVE ELECTRODE ACTIVE MATERIAL

CROSS-REFERENCE TO RELATED APPLICATION

Korean Patent Application No. 10-2015-0155275, filed on Nov. 5, 2015, in the Korean Intellectual Property Office, and entitled: "Positive Electrode Active Material, Preparing Method Thereof, and Lithium Secondary Battery Including Positive Electrode Comprising the Positive Electrode Active Material," is incorporated by reference herein in its entirety.

BACKGROUND

1. Field

Embodiments relate to a positive electrode active material, a method of preparing the positive electrode active material, and a lithium secondary battery including a positive electrode including the positive electrode active material.

2. Description of the Related Art

In order to use lithium secondary batteries in high-performance electric vehicles, an improvement of the lithium secondary batteries in terms of high capacity, high output, and safety is desirable.

SUMMARY

Embodiments are directed to a positive electrode active material including a lithium composite oxide and a zirconium oxide coating layer and a lithium zirconium oxide coating layer that are in a form of sequential layers on the lithium composite oxide.

The lithium composite oxide may be a compound represented by Formula 1:

   [Formula 1]

wherein, in Formula 1, M' is at least one metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo) and tungsten (W), and $0.8<a\leq1.3$, $0<x\leq1$, $0<y\leq1$, $0\leq z<1$ and $x+y+z\leq1$.

An amount of the lithium zirconium oxide may be in a range of about 0.05 mol % to about 5 mol % relative to the total molar amount 1.0 mol of a transition metal of the lithium composite oxide.

An amount of the zirconium oxide may be in a range of about 0.05 mol % to about 5 mol % relative to the total molar amount of a transition metal of the lithium composite oxide.

A thickness of the lithium zirconium oxide coating layer and a thickness of the zirconium oxide coating layer may each be in a range of about 1 nm to about 20 nm.

The positive electrode active material may further include an additional lithium zirconium oxide coating layer having a thickness of about 5 nm or less between the lithium composite oxide and the zirconium oxide coating layer.

Embodiments are also directed to a method of preparing a positive electrode active material for a lithium secondary battery including mixing and drying a lithium composite oxide, a zirconium precursor, and a solvent and adding a lithium precursor to the resultant of the mixing and drying process, and heat-treating the resultant having the lithium precursor added thereto to prepare a positive electrode active material having the composition and structure described herein.

The heat-treating may be performed at a temperature in a range of about 600° C. to about 900° C.

An amount of the zirconium precursor may be in a range of about 0.05 mol % to about 5 mol % relative to the total molar amount of a transition metal of the lithium composite oxide.

An amount of the lithium precursor may be in a range of about 0.01 part to about 2.0 parts by weight based on 100 parts by weight of the lithium composite oxide.

The zirconium precursor may be or may include zirconium acetylacetonate, zirconium hydroxide, zirconium carbonate, or zirconium acetate.

Embodiments are also directed to a lithium secondary battery including a positive electrode active material including a lithium composite oxide, and a zirconium oxide coating layer and a lithium zirconium oxide coating layer that are in a form of sequential layers on the lithium composite oxide.

The lithium composite oxide may be a compound represented by Formula 1:

   [Formula 1]

wherein, in Formula 1 M' is at least one metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo) and tungsten (W); and $0.8<a\leq1.3$, $0<x\leq1$, $0<y\leq1$, $0\leq z<1$, and $x+y+z\leq1$.

An amount of the lithium zirconium oxide may be in a range of about 0.05 mol % to about 5 mol % relative to the total molar amount of a transition metal of the lithium composite oxide.

An amount of the zirconium oxide may be in a range of about 0.05 mol % to about 5 mol % relative to the total molar amount of a transition metal of the lithium composite oxide.

A thickness of the lithium zirconium oxide coating layer and a thickness of the zirconium oxide coating layer may each be in a range of about 1 nm to about 20 nm.

The lithium secondary battery may further include a lithium zirconium oxide coating layer having a thickness of about 5 nm or less between the lithium composite oxide and the zirconium oxide coating layer.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
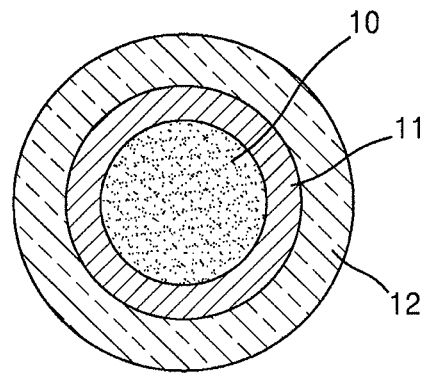
FIG. 1A illustrates a schematic view of a structure of a positive electrode active material according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

Expressions such as "at least one of," when preceding a list of elements, modify the entire list of elements and do not modify the individual elements of the list.

According to an exemplary embodiment, a positive electrode active material for a lithium secondary battery includes a lithium composite oxide, and a zirconium oxide coating layer and a lithium zirconium oxide coating layer that are sequentially formed on the lithium composite oxide in this order.

The positive electrode active material according to an embodiment may have a structure that includes the zirconium oxide ($ZrO_2$) coating layer on a surface of the lithium composite oxide and the lithium zirconium oxide ($Li_2ZrO_3$) coating layer on the zirconium oxide ($ZrO_2$) coating layer.

In the positive electrode active material according to the present embodiment, thicknesses of the lithium zirconium oxide ($Li_2ZrO_3$) coating layer and the zirconium oxide ($ZrO_2$) coating layer may be in a range of, for example, about 1 nm to about 20 nm, or, for example, about 5 nm to about 15 nm. Also, the total thickness of the lithium zirconium oxide ($Li_2ZrO_3$) coating layer and the zirconium oxide ($ZrO_2$) coating layer may be controlled to be in a range of about 5 nm to about 30 nm.

In some embodiments, a thickness ratio of the lithium zirconium oxide ($Li_2ZrO_3$) coating layer and the zirconium oxide ($ZrO_2$) coating layer may be in a range of about 1:0.5 to about 1:2, or, for example, about 1:1. When the thickness ratio is within this range, the lithium secondary battery including the positive electrode active material may have improved lifespan and storage characteristics.

Herein, the term "storage characteristics" may refer to a capacity of a cell for evaluation when the cell remains at a high temperature (generally at 60° C.) for 24 hours at a charged state, discharged (Rt: Retention), charged, and discharged (Re: Recovery). The storage cell evaluation tests whether a surface of an active material is damaged by a side reaction with an electrolyte solution or whether characteristics of a battery deteriorate due to an open circuit voltage drop that could occur by a self discharge during storage at a charged state. When storage characteristics are improved, it may be deemed that a side reaction with an electrolyte at a high-temperature storage after charging is effectively prevented.

In the positive electrode active material, an amount of the lithium zirconium oxide may be in a range of about 0.05 mol % to about 5 mol %, or, for example, about 0.1 mol % to about 0.5 mol %, relative to the total molar amount of a transition metal of the lithium composite oxide. Also, an amount of the zirconium oxide may be in a range of about 0.05 mol % to about 5 mol %, or, for example, about 0.1 mol % to about 0.5 mol %, relative to the total molar amount of a transition metal of the lithium composite oxide.

When the amounts of the lithium zirconium oxide and the zirconium oxide are within the ranges above, the lifespan and storage characteristics of the lithium secondary battery including a positive electrode that includes the positive electrode active material may be improved.

A lithium zirconium oxide coating layer having a thickness in a range of about 5 nm of less, or, for example, in a range of about 0.1 nm to about 5 nm, may be further included between the lithium composite oxide and the zirconium oxide coating layer.

The lithium composite oxide may be a compound represented by Formula 1.

[Formula 1]

In Formula 1, M' is a metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W); and $0.8<a\le1.3$, $0<x\le1$, $0<y\le1$, $0\le z<1$, and $x+y+z\le1$.

In Formula 1, x may be in a range of about 0.5 to about 0.8; and y may be in a range of about 0.1 to about 0.2. Also in Formula 1, it is to be understood that when x+y+z is 1 or greater, Mn is not present.

The lithium composite oxide may be, for example, a compound represented by Formula 2.

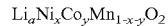

[Formula 2]

In Formula 2, $0.8<a\le1.3$, $0.4\le x\le1$, $0<y\le0.4$, and $x+y\le1.2$.

In Formula 2, Co and Mn may be each independently substituted by at least one selected from Al, Ca, Nb, B, Sr, Cu, Y, Mg, Cr, Fe, Ti, Zr, Mo. Al, Mg, Si, and Zn. Also in Formula 2, it is to be understood that when x+y is 1 or greater. Mn is not present.

In Formula 2, x may be in a range of about 0.5 to about 0.8; and y may be in a range of about 0.1 to about 0.2.

The lithium composite oxide may be, for example, $LiNi_{0.5}Co_{0.2}Mn_{0.3}O_2$, $LiNi_{0.6}Co_{0.2}Mn_{0.2}O_2$, or $LiNi_{0.8}Co_{0.1}Mn_{0.1}O_2$.

FIG. 1A illustrates a schematic view of a structure of a positive electrode active material 1 according to an exemplary embodiment.

Referring to FIG. 1A, the positive electrode active material 1 may have a structure including a lithium composite oxide 10; and a zirconium oxide coating layer 11 and a lithium zirconium oxide coating layer 12 that are sequentially formed on the lithium composite oxide 10.

The zirconium oxide coating layer 11 and the lithium zirconium oxide coating layer 12 may each have a continuous layer shape or a discontinuous layer shape. For example, the discontinuous layer shape may be in the form of islands.

The zirconium oxide coating layer 11 and the lithium zirconium oxide coating layer 12 may be formed in a suitable thickness ratio.

Hereinafter, a method of preparing a positive electrode active material, according to an embodiment, will be described.

A lithium composite oxide, a zirconium precursor, and a solvent may be mixed, and the mixture may be dried to remove the solvent therefrom. The mixing may be performed by obtaining a solution prepared by dissolving the zirconium precursor in the solvent, and adding the lithium composite oxide to the solution. The lithium composite oxide may be dispersed in water and the solvent.

The zirconium precursor may be a suitable material that contains zirconium. Examples of the zirconium precursor may include zirconium acetylacetonate, zirconium hydroxide, zirconium carbonate, or zirconium acetate.

An amount of zirconium precursor may be in a range of about 0.05 mol % to about 5 mol %, or, for example, about 0.1 mol % to about 2.0 mol %, relative to the total molar amount of a transition metal of the lithium composite oxide. When the amount of the zirconium precursor is within this range, a lithium secondary battery may have excellent lifespan characteristics.

Examples of the solvent may include water or alcohol. Examples of the alcohol may include ethanol, butanol, methanol, propanol, and isopropanol.

The drying process may be performed at a temperature in a range of about 60° C. to about 120° C. The solvent may be removed through the drying process.

The resultant may be mixed with a lithium precursor and heat-treated. As a result, a positive electrode active material for a lithium secondary battery including a zirconium oxide coating layer and a lithium zirconium oxide coating layer that are sequentially formed on a surface of a lithium composite oxide may be provided.

Figure 1B:
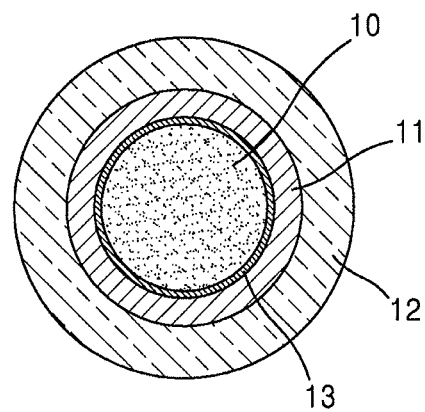
FIG. 1B illustrates a schematic view of a structure of a positive electrode active material according to another exemplary embodiment

Through the heat-treating process, lithium of the lithium composite oxide may disperse. In this case, as illustrated in FIG. 1B, an additional lithium zirconium oxide coating layer 13 having a thickness of 5 nm of less may be further formed between the lithium composite oxide 10 and the zirconium oxide coating layer 11. With the additional lithium zirconium oxide coating layer 13 having a thickness of 5 nm or less, the long lifespan characteristics of the battery may be improved.

The heat-treating may be performed under an oxidative gas atmosphere or an inert gas atmosphere at a temperature range of about 600° C. to about 900° C., or, for example, at a temperature range of about 700° C. to about 850° C. Here, the term "oxidative gas atmosphere" refers to an oxygen or air atmosphere. The term "inert gas atmosphere" refers to an atmosphere that is formed by using an inert gas such as argon or nitrogen.

The heat-treating time may vary depending on the heat-treating temperature. For example, the heat-treating time may be in a range of about 0.5 hour to about 20 hours. When the heat-treating time is within this range, a lithium secondary battery including the positive electrode active material may have excellent lifespan and storage characteristics.

The lithium precursor may be a suitable lithium precursor, such as, for example, lithium hydroxide (LiOH), lithium carbonate ($Li_2CO_3$), lithium sulfate ($Li_2SO_4$), lithium nitrate ($LiNO_3$), or lithium oxide.

An amount of the lithium precursor may be in a range of about 0.01 part to about 2.0 parts by weight, or, for example, about 0.1 part to about 0.5 part by weight, based on 100 parts by weight of the lithium composite oxide.

The lithium composite oxide may be manufactured by using a suitable method. An example of the preparation method may be as follows.

For example, a lithium composite oxide precursor represented by Formula 3 may be mixed with a lithium precursor, and the mixture may be heat-treated under an oxidative gas atmosphere at a temperature in a range of about 400° C. to about 900° C.

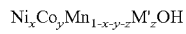

$$Ni_xCo_yMn_{1-x-y-z}M'_zOH \qquad \text{[Formula 3]}$$

In Formula 3, M' is at least one metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W); and $0<x\leq1$, $0<y\leq1$, and $0\leq z<1$.

In Formula 3, x may be in a range of about 0.5 to about 0.8; and y may be in a range of about 0.1 to about 0.2. Also in Formula 3, it is to be understood that when x+y+z is 1 or greater, Mn is not present.

In some embodiments, the lithium composite oxide precursor may be or include, for example, $Ni_{0.5}Co_{0.2}Mn_{0.3}(OH)_2$, $Ni_{0.6}Co_{0.2}Mn_{0.2}(OH)_2$, or $Ni_{0.8}Co_{0.1}Mn_{0.1}(OH)_2$.

Examples of the lithium precursor may be or include lithium hydroxide (LiOH), lithium carbonate ($Li_2CO_3$), lithium sulfate ($Li_2SO_4$), lithium nitrate ($LiNO_3$), or lithium oxide.

The lithium composite oxide precursor represented by Formula 3 may be obtained as follows.

A nickel precursor, a cobalt precursor, and a manganese precursor may be mixed together. A precipitating agent, a chelating agent, and a solvent may be mixed with the mixture, and the pH of the mixture is controlled to allow co-precipitation of the mixture such that the lithium composite oxide precursor represented by Formula 3 may be obtained. In the mixing of the precursors, a precursor containing M' of Formula 1 may be further included.

The precipitating agent may be a pH controlling agent. Examples of the pH controlling agent may include a sodium hydroxide solution or an ammonium hydroxide.

The chelating agent may control a formation rate of a precipitate from the co-precipitation. Examples of the chelating agent may include sodium hydroxide, ammonium carbonate, sodium oxalate, ammonia, or ammonium sulfate.

The mixture may be purged with nitrogen. The co-precipitate obtained with or without a nitrogen-purge may be washed, filtered, and dried to obtain a composite hydroxide.

The drying may be performed at a temperature in range of about 60° C. to about 120° C.

The nickel precursor, the cobalt precursor, the manganese precursor, and the precursor containing M' may be an oxide, hydroxide, carbonate, acetate, sulfate including nickel, cobalt, manganese, and M'. Amounts of the nickel precursor, the cobalt precursor, the manganese precursor, and the precursor containing M' may be stoichiometrically controlled to obtain a lithium composite oxide precursor represented by Formula 3.

Examples of the solvent may include water or alcohol.

The positive electrode active material thus obtained may have a remaining lithium content of about 0.01% to about 0.1%. With such a small amount of remaining lithium, generation of gas may be avoided. In this regard, the positive electrode active material is excellent in terms of safety.

According to another aspect of an exemplary embodiment, provided is a lithium secondary battery including a positive electrode that includes the positive electrode active material.

The positive electrode may be prepared as follows.

A positive electrode active material, a binder, and a solvent may be mixed together to prepare a positive electrode active material composition.

A conducting agent may be further added to the positive electrode active material composition.

The positive electrode active material composition may be directly coated onto a metal current collector to prepare a positive electrode plate. In some implementations, the positive electrode active material composition is cast on a separate support, and a film detached from the separate support is laminated on a metal current collector to prepare a positive electrode plate.

In the preparation of the positive electrode, an additional positive electrode active material that is a common positive electrode active material generally used in a lithium secondary battery in the art may be further added.

The additional positive electrode active material may be a suitable positive active material such as at least one selected from a lithium cobalt oxide, a lithium nickel cobalt manganese oxide, a lithium nickel cobalt aluminum oxide, a lithium iron phosphate, and a lithium manganese oxide.

For example, the positive electrode active material may be represented by one of $Li_aA_{1-b}B'_bD_2$ (where, $0.90 \leq a \leq 1.8$ and $0 \leq b \leq 0.5$); $Li_aE_{1-b}B'_bO_{2-c}D_c$ (where, $0.90 \leq a \leq 1.8$, $0 \leq b \leq 0.5$, and $0 \leq c \leq 0.05$); $LiE_{2-b}B'_bO_{4-c}D_c$ (where, $0 \leq b \leq 0.5$ and $0 \leq c \leq 0.05$); $Li_aNi_{1-b-c}Co_bB'_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $V_2O_5$; $LiV_2O_5$; $LiI'O_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A, B', D, E, F', G, Q, I', and J are variables representing elements as defined below. (The ' symbol is added to B', F', and I' to avoid confusion with the chemical symbols B, F, and I for boron, fluorine, and iodine.) In more detail, A is Ni, Co, Mn, or a combination thereof; B' is Al, Ni, Co, Mn, Cr, Fe, Mg, Sr, V, a rare-earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

A suitable conducting agent used in the related art may be used. Examples of the conducting agent for the cathode active material layer-forming composition may include carbon black, graphite particles, natural graphite, artificial graphite, acetylene black, Ketjen black or carbon fibers; carbon nanotubes, or metal powders, metal fibers or metal tubes of copper, nickel, aluminum, silver, etc., and conductive polymers such as polyphenylene derivatives.

Examples of the binder may include vinylidene fluoride/hexafluoropropylene copolymers, polyvinylidene fluoride, polyimide, polyethylene, polyester, polyacrylonitrile, polymethylmethacrylate, polytetrafluoroethylene (PTFE), carboxymethyl cellulose/styrene-butadiene rubber (SMC/SBR) copolymers, styrene butadiene rubber based polymers, and mixtures thereof.

A suitable solvent used in the related art may be used. Examples of the solvent may include N-methylpyrrolidone, acetone and water.

Also, a plasticizer may be further added to the positive electrode active material composition and/or the negative electrode active material composition to form pores in an electrode plate.

Amounts of the positive electrode active material, the conducting agent, the binder, and the solvent may be at the same levels used in a general lithium secondary battery. At least one of the conducting agent, the binder, and the solvent may be omitted depending on a use or a structure of the lithium secondary battery.

A negative electrode may be prepared by substantially the same method as that of the positive electrode, except that a negative electrode active material is used instead of a positive electrode active material.

The negative electrode active material may be a carbonaceous material, silicon, a silicon oxide, a silicon-based alloy, a silicon-carbonaceous material composite, tin, a tin-based alloy, a tin-carbon composite, a metal oxide, or a combination thereof.

A suitable carbonaceous material used in the related art may be used. Examples of the carbonaceous material may include crystalline carbon, amorphous carbon, or a mixture thereof. The crystalline carbon may be graphite, such as natural graphite or artificial graphite that is in non-shaped, plate, flake, spherical, or fibrous form. The amorphous carbon may be soft carbon (carbon sintered at low temperatures), hard carbon, meso-phase pitch carbides, sintered cokes, graphene, carbon black, fullerene soot, carbon nanotubes, or carbon fibers.

The negative electrode active material may be selected from Si, SiOx (where, $0 < x < 2$, or, for example, $0.5 < x < 1.5$), Sn, $SnO_2$, or a silicon-containing metal alloy, and a mixture thereof. A metal that may form the silicon alloy may be at least one selected from Al, Sn, Ag, Fe, Bi, Mg, Zn, in, Ge, Pb, and Ti.

The negative electrode active material may include metal/semi-metal alloyable with lithium, an alloy thereof, or an oxide thereof. For example, the metal/semi-metal alloyable with lithium, an alloy thereof, or an oxide thereof may be Si, Sn, Al, Ge, Pb, Bi, Sb, an Si—Y' alloy (where, Y' is an alkaline metal, an alkaline earth metal, a Group 13 element, a Group 14 element, a transition metal, a rare earth element, or a combination of elements thereof, and is not Si), a Sn—Y" alloy (where, Y" is an alkaline metal, an alkaline earth metal, a Group 13 element, Group 14 element, a transition metal, a rare earth element, or a combination of elements thereof, and is not Sn), or $MnO_x$ (where, $0 < x \leq 2$). Examples of the elements Y' and Y" may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Examples of the oxide of the metal/metalloid alloyable with lithium may include a lithium titanium oxide, a vanadium oxide, a lithium vanadium oxide, $SnO_2$, or $SiO_x$ ($0 < x < 2$).

For example, the negative electrode active material may include at least one element selected from Group 13 elements, Group 14 elements, and Group 15 elements.

For example, the negative electrode active material may include at least one element selected from Si, Ge, and Sn.

In the preparation of the negative electrode, a conducting agent, a binder, and a solvent may be the same as those used in the preparation of the positive electrode active material composition.

Amounts of the negative electrode active material, conducting agent, binder, and solvent may be those generally used in a lithium battery.

A separator may be disposed between the positive electrode and the negative electrode. The separator may be an insulating thin film having high ion permeability and mechanical strength.

A pore diameter of a separator may be generally in a range of about 0.01 μm to about 10 μm. A thickness of the separator may generally be in a range of about 5 μm to about 20 μm. The separator may be or include, for example, an olefin-based polymer such as polypropylene; or a sheet or a non-woven fabric formed of glass fibers or polyethylene. When a solid polymer electrolyte is used as an electrolyte, the solid polymer electrolyte may also serve as a separator.

Examples of the olefin-based polymer among examples of the separator may include polyethylene, polypropylene, polyvinylidene fluoride, or a multi-layer including at least two layers selected therefrom. In some embodiments, the olefin-based polymer may be a mixed multi-layer such as a polyethylene/polypropylene 2-layered separator, a polyethylene/polypropylene/polyethylene 3-layered separator, or a polypropylene/polyethylene/polypropylene 3-layered separator.

The lithium salt-containing non-aqueous electrolyte may include a non-aqueous electrolyte and a lithium salt.

Examples of the lithium salt-containing non-aqueous electrolyte may include a non-aqueous electrolyte solution, an organic solid electrolyte, or an inorganic solid electrolyte.

The non-aqueous electrolyte solution may include a suitable organic solvent. Examples of the non-aqueous electrolyte solution may include propylene carbonate, ethylenecarbonate, fluoroethylenecarbonate, butylenecarbonate, dimethylcarbonate, diethylcarbonate, methylethylcarbonate, methylpropylcarbonate, ethylpropylcarbonate, methyl isopropylcarbonate, dipropylcarbonate, dibutylcarbonate, fluoroethylenecarbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethylether, and a mixture thereof.

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, and polymers containing ionic dissociation groups.

Examples of the inorganic solid electrolyte may include nitrides, halides, or sulfates of lithium such as $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt is a material that is readily soluble in the non-aqueous electrolyte. Examples of the lithium salt may include $LiPF_6$, $LiBF_4$, $LiSbF_6$, $LiAsF_6$, $LiClO_4$, $LiCF_3SO_3$, $LiN(CF_3SO_2)_2$, $LiN(FSO_2)_2$, $LiC_4F_9SO_3$, $LiAlO_2$, $LiAlCl_4$, $LiN(C_xF_{2x+1}SO_2)(C_yF_{2y+1}SO_2)$ (where, x and y are natural numbers), LiCl, LiI, or a mixture thereof. In order to increase charging/discharging characteristics or flame resistance of the non-aqueous electrolyte, for example, the non-aqueous electrolyte may further include pyridine, triethylphosphite, triethanolamine, cyclic ether, ethylenediamine, n-glyme, hexamethyl phosphoramide, nitrobenzene derivatives, sulfur, quinone imide dyes, N-substituted oxazolidinone, N,N-substituted imidazolidine, ethyleneglycol dialkylether, ammonium salts, pyrrole, 2-methoxyethanol, or aluminum trichloride. In some implementations, in order to impart incombustibility, the non-aqueous electrolyte may further include a halogen-containing solvent such as carbon tetrachloride or ethylene trifluoride.

Figure 2:
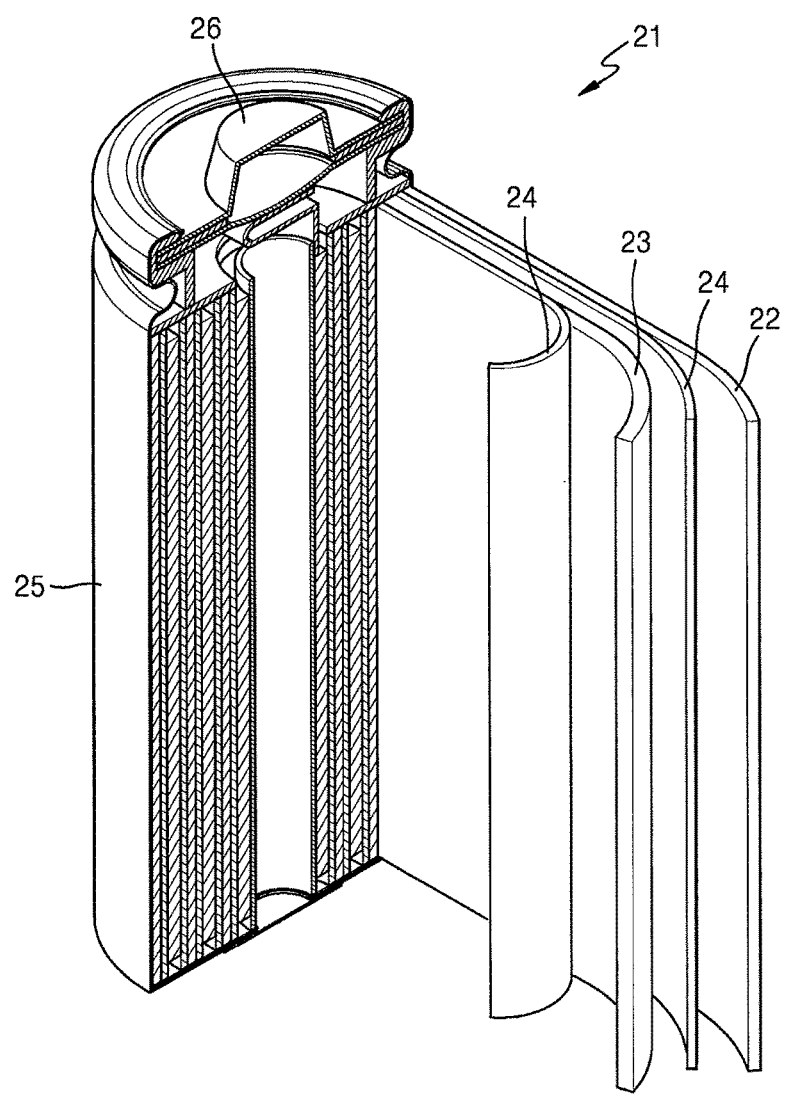
FIG. 2 illustrates a schematic view of a lithium secondary battery according to an exemplary embodiment.

As shown in FIG. 2, a lithium battery 21 may include a positive electrode 23, a negative electrode 22, and a separator 24. The positive electrode 23, the negative electrode 22, and the separator 24 may be wound and/or folded to be accommodated in a battery case 25. Then, an organic electrolyte solution may be injected into the battery case 25, and the battery case 25 is sealed with a cap assembly 26, thereby completing the manufacture of the lithium battery 21. The battery case 25 may have a shape of a cylinder, a box, or a film.

A battery assembly may be prepared by disposing a separator between a positive electrode and a negative electrode. A plurality of the battery assemblies may be stacked in a bi-cell structure and impregnated with the electrolyte solution. The resultant may be put into a pouch and sealed, thereby completing the manufacture of a lithium ion polymer battery.

Also, a plurality of the battery assemblies may be stacked to form a battery pack, which may be used in any device that requires high capacity and high output, for example, in a laptop computer, a smart phone, or an electric vehicle (EV).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

COMPARATIVE EXAMPLE 1

Preparation of Lithium Composite Oxide (NCM Bare Material)

Nickel sulfate ($NiSO_4$-$6H_2O$), as a nickel precursor, cobalt sulfate ($CoSO_4$-$7H_2O$), as a cobalt precursor, and manganese sulfate ($MnSO_4$—$H_2O$), as a manganese precursor, were mixed together to prepare a precursor mixture. Here, amounts of nickel sulfate, cobalt sulfate, and manganese sulfate were stoichiometrically controlled to prepare a nickel cobalt manganese hydroxide ($Ni_{0.5}Co_{0.2}Mn_{0.3}(OH)_2$).

Ammonia water ($NH_4OH$) was added to the precursor mixture to perform co-precipitation, and thus a precipitate was obtained. The precipitate was washed with pure water and dried, and thus a nickel cobalt manganese hydroxide ($Ni_{0.5}Co_{0.2}Mn_{0.3}(OH)_2$) was obtained.

The nickel cobalt manganese hydroxide thus obtained and a lithium carbonate were mixed together, and the mixture was heat-treated at a temperature of 900° C. in the air, such that a lithium nickel cobalt oxide was obtained. Amounts of the nickel cobalt manganese hydroxide and the lithium carbonate were stoichiometrically controlled to prepare a lithium nickel cobalt oxide ($LiNi_{0.5}Co_{0.2}Mn_{0.3}O_2$), which was used as a positive active material or precursor in Comparative Examples 2-4 and was also used as a starting material for forming the positive electrode active material of Example 1.

EXAMPLE 1

Preparation of Positive Electrode Active Material 100 parts by weight of the lithium nickel cobalt manganese oxide ($LiNi_{0.5}Co_{0.2}Mn_{0.3}O_2$) prepared in Comparative Example 1 was dispersed in 100 parts by weight of ethanol, and a zirconium precursor solution prepared by dissolving 1.3 parts by weight of zirconium acetylacetonate in 30 parts by weight of ethanol was added thereto. An amount of the zirconium acetylacetonate was about 0.25 mol % relative to the total molar amount of a transition metal of the lithium nickel cobalt manganese oxide.

The mixture thus obtained was stirred for about 3 hours, and the reaction mixture was dried at a temperature of about 120° C.

A lithium carbonate was added to the resultant thus obtained, and the mixture was heat-treated at a temperature of about 800° C. in air. A positive electrode active material including a zirconium oxide coating layer and a lithium zirconium oxide coating layer in a form of sequentially formed layers on a lithium nickel cobalt manganese oxide ($LiNi_{0.5}Co_{0.2}Mn_{0.3}O_2$) was obtained. Here, an amount of the lithium carbonate was about 0.1 part by weight based on 100 parts by weight of the lithium nickel cobalt manganese oxide ($LiNi_{0.5}Co_{0.2}Mn_{0.3}O_2$).

EXAMPLE 2

Preparation of Positive Electrode Active Material

A positive electrode active material including a zirconium oxide coating layer and a lithium zirconium oxide coating layer in a form sequentially formed layers on a lithium nickel cobalt manganese oxide ($LiNi_{0.5}Co_{0.2}Mn_{0.3}O_2$) was obtained in the same manner as in Example 1, except that an amount of the lithium carbonate was changed to about 0.5 parts by weight.

EXAMPLE 3

Preparation of Positive Electrode Active Material

A positive electrode active material including a zirconium oxide coating layer and a lithium zirconium oxide coating layer in a form of sequentially formed layers on a lithium nickel cobalt manganese oxide ($LiNi_{0.5}Co_{0.2}Mn_{0.3}O_2$) was obtained in the same manner as in Example 1, except that an amount of the zirconium acetylacetonate was changed to about 0.05 mol % relative to the total molar amount of a transition metal of the lithium nickel cobalt manganese oxide.

EXAMPLE 4

Preparation of Positive Electrode Active Material

A positive electrode active material including a zirconium oxide coating layer and a lithium zirconium oxide coating layer in a form of sequentially formed layers on a lithium nickel cobalt manganese oxide ($LiNi_{0.5}Co_{0.2}Mn_{0.3}O_2$) was obtained in the same manner as in Example 1, except that an amount of the zirconium acetylacetonate was changed to about 5 mol % relative to the total molar amount of a transition metal of the lithium nickel cobalt manganese oxide.

COMPARATIVE EXAMPLE 2

Preparation of Positive Electrode Active Material

The lithium nickel cobalt manganese oxide ($LiNi_{0.5}Co_{0.2}Mn_{0.3}O_2$) prepared in Comparative Example 1 was post heat-treated at a temperature of 800° C. in air such that a positive electrode active material was obtained.

COMPARATIVE EXAMPLE 3

Preparation of Positive Electrode Active Material 100 parts by weight of the lithium nickel cobalt manganese oxide ($LiNi_{0.5}Co_{0.2}Mn_{0.3}O_2$) prepared in Comparative Example 1 was dispersed in 100 parts by weight of ethanol, and a zirconium precursor solution, which was prepared by dissolving 1.3 parts by weight of zirconium acetylacetonate in 30 parts by weight of ethanol, was added thereto. The amount of the zirconium acetylacetonate was about 0.25 mol % relative to the total molar amount of a transition metal of the lithium nickel cobalt manganese oxide.

The mixture thus obtained was stirred for about 3 hours, and the reaction mixture was dried at a temperature of about 120° C. Thus, a positive electrode active material having a zirconium oxide coating layer formed on a lithium nickel cobalt manganese oxide ($LiNi_{0.5}Co_{0.2}Mn_{0.3}O_2$) was obtained.

COMPARATIVE EXAMPLE 4

Preparation of Positive Electrode Active Material

A solution prepared by dissolving 0.6 parts by weight of $Zr(NO_3)_4 \cdot 5H_2O$ and 0.17 parts by weight of $CH_3COOLi$ in 100 parts by weight of ethanol was added to the lithium nickel cobalt manganese ($LiNi_{0.5}Co_{0.2}Mn_{0.3}O_2$) prepared in Comparative Example 1, and the mixture was stirred at a temperature of 60° C.

When the reaction was completed, a solvent was removed from the reaction mixture, and the resultant was heat-treated at a temperature of about 650° C. Thus, a positive electrode active material having a lithium nickel cobalt manganese oxide ($LiNi_{0.5}Co_{0.2}Mn_{0.3}O_2$) and a lithium zirconium oxide coating layer formed on the lithium nickel cobalt manganese oxide was prepared.

MANUFACTURING EXAMPLE 1

Manufacture of Lithium Secondary Battery (Coin-half Cell)

A coin-half cell using the positive electrode active material prepared in Example 1 was prepared as follows.

A mixture of the positive electrode active material prepared in Example 1, polyvinylidene fluoride, and carbon black, as a conducting agent, were added to a mixer to remove bubbles, thereby providing a homogenously mixed slurry for forming a positive electrode active material layer N-methylpyrrolidone, as a solvent, was added to the mixture. A mixing ratio, by weight, of the composite positive electrode active material, polyvinylidene fluoride, and carbon black was 92:4:4.

The slurry thus prepared was coated onto aluminum foil by using a doctor blade in the form of a thin film, dried at a temperature of 135° C. for about 3 hours or more, and then pressed and vacuum-dried to prepare a positive electrode.

A lithium metal electrode was used as a counter electrode of the positive electrode to prepare a 2032 type coin-half cell. A separator formed of porous polyethylene (PE) film and having a thickness of about 16 μm was disposed between the positive electrode and the lithium metal electrode. An electrolyte solution was injected thereto to prepare a coin-half cell. The electrolyte was prepared by dissolving 1.1 M of $LiPF_6$ in a mixture solution including ethylene carbonate (EC), ethylmethyl carbonate (EMC), and dimethylcarbonate (DMC), at a mixing volume ratio of 3:4:3.

MANUFACTURING EXAMPLES 2 to 4

Coin-half cells were prepared in the same manner as in Manufacturing Example 1, except that the positive electrode active materials prepared in Examples 2 to 4 were used instead of the positive electrode active material prepared in Example 1, respectively.

Comparative Manufacturing Examples 1 to 4

Coin-half cells were prepared in the same manner as in Manufacturing Example 1, except that the positive electrode active materials prepared in Comparative Examples 1 to 4 were used instead of the positive electrode active material prepared in Example 1, respectively.

EVALUATION EXAMPLE 1

Remaining Lithium Analysis

Remaining lithium in the positive electrode active materials prepared in Examples 1 and 2 and the composite positive electrode active material prepared in Comparative Example 3 were analyzed, and the results are shown in Table 1. Here, the remaining lithium was evaluated by using Metrohm (888.814 autosystem), and amounts of lithium carbonate and lithium hydroxide shown in Table 1 were calculated according to amounts of HCl.

TABLE 1

|  | $Li_2CO_3$ (wt %) | LiOH (wt %) | Remaining lithium (wt %) |
| --- | --- | --- | --- |
| Example 1 | 0.19 | 0.11 | 0.07 |
| Example 2 | 0.2 | 0.14 | 0.07 |
| Comparative Example 3 | 0.17 | 0.12 | 0.08 |

As shown in Table 1, remaining lithium amounts of the positive electrode active materials prepared in Examples 1 and 2 did not significantly increase compared to that of the positive electrode active material prepared in Comparative Example 3, and thus it may be shown that the lithium precursor used in Examples 1 and 2 participated in the formation of the lithium zirconium oxide.

In the positive electrode active material, high amounts of $Li_2CO_3$ and LiOH may indicate that some lithium has not participated in reaction, such that a LZO phase may not be properly formed. Thus, it may be indirectly shown that the LZO phases of the positive electrode active material of Examples 1 and 2 are relatively well formed in view of the amounts of $Li_2CO_3$ and LiOH shown in Table 1.

EVALUATION EXAMPLE 2

Field Emission Scanning Electron Microscope (FE-SEM)

Figure 3A:
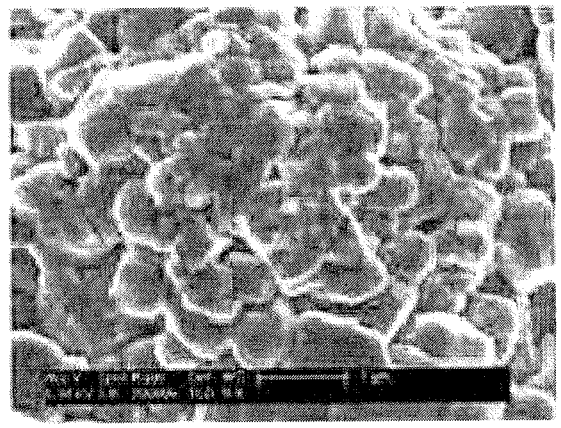
FIGS. 3A and 3B illustrate the results of field emission scanning electron microscope (FE-SEM) analysis performed on a positive electrode active material prepared in Example 1.
Figure 3B:
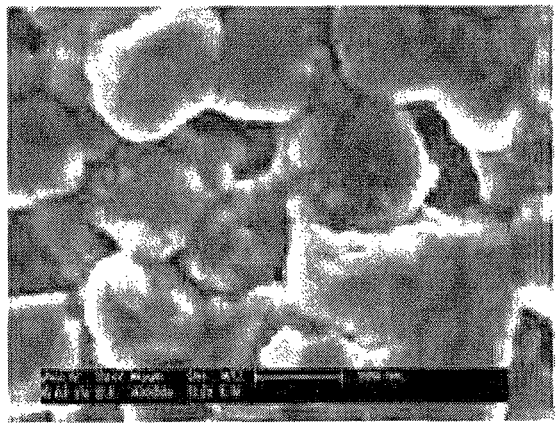
Figure 4A:
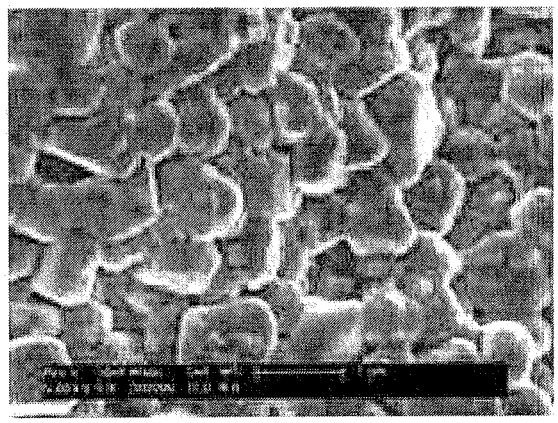
FIGS. 4A and 4B illustrate the results of FE-SEM analysis performed on the positive electrode active material prepared in Example 2.
Figure 4B:
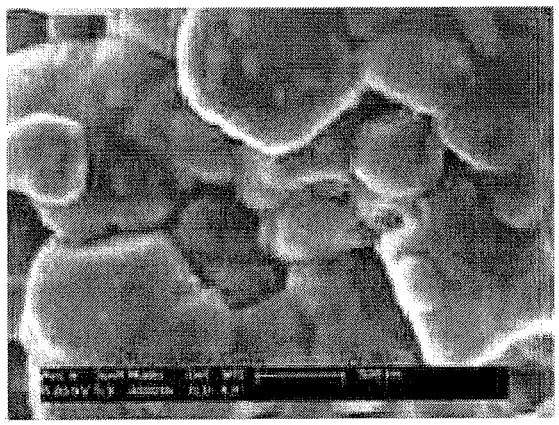
Figure 5A:
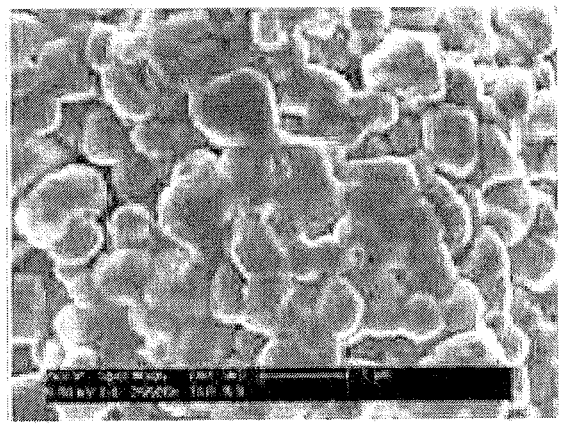
FIGS. 5A and 5B illustrate the results of FE-SEM analysis performed on the positive electrode active material prepared in Comparative Example 3.
Figure 5B:
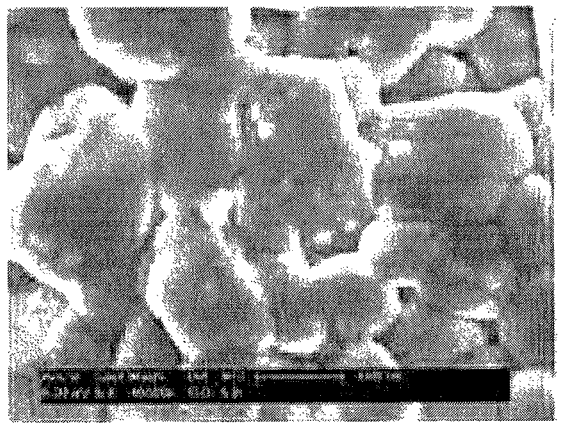

Field emission scanning electron microscope analysis was performed on the positive electrode active materials prepared in Example 1 and 2 and the composite positive electrode active material prepared in Comparative Example 3, and the results are shown in FIGS. 3A and 3B (Example 1), 4A and 4B (Example 2), and 5A and 5B (Comparative Example 3). FIGS. 3B, 4B, and 5B are each magnified views of FIGS. 2A, 3A, and 4A.

Referring to FIGS. 3A to 5B, a coating layer coating ZrO2 and an LZO layer thereon have a different shape (in the form of a thicker shape by having one more layer of an LZO layer).

EVALUATION EXAMPLE 3

Transmission Electron Microscopy (TEM) Analysis

Figure 6A:
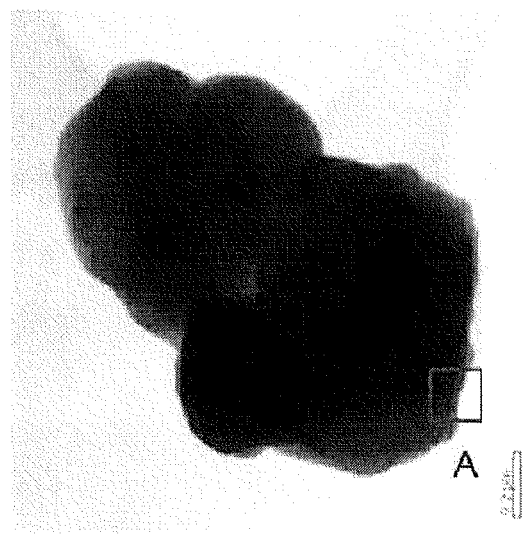
FIGS. 6A and 6B illustrate the results of transmission electron microscope (TEM) analysis performed on the positive electrode active material prepared in Example 1.
Figure 6B:
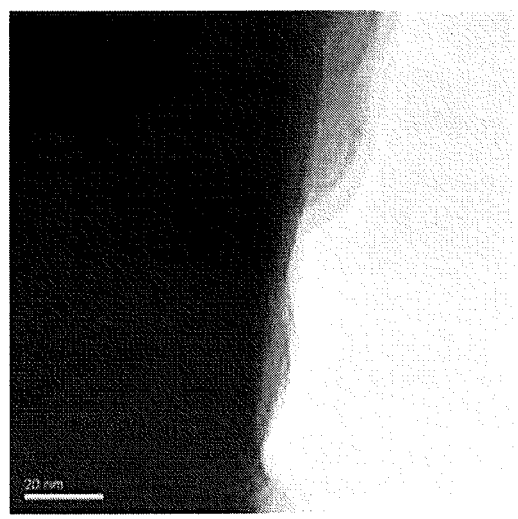

Transmission electron microscopy (TEM) analysis was performed on the positive electrode active material of Example 1. The results of the TEM analysis are shown in FIGS. 6A and 6B. FIG. 5B is a magnified view of region A in FIG. 5A.

As shown in FIGS. 6A and 6B, it may be confirmed that a double coating layer was present in the positive electrode active material of Example 1, and that each of coating layers constituting the double coating layer has a thickness of about 5 nm. In this regard, the double coating layer may effectively prevent the positive electrode active material from reacting with an electrolyte solution, and thus lifespan characteristics of a lithium secondary battery including the positive electrode active material may be improved.

EVALUATION EXAMPLE 4

Room Temperature Lifespan Characteristics

Charging/discharging characteristics of the coin-half cells prepared in Manufacturing Example 1 and Comparative Manufacturing Examples 1 to 3 were evaluated by using a charging/discharging device (model: TOYO-3100) available from TOYO.

In the first cycle, each of the coin-half cells was charged at room temperature (25° C.) at a constant current of 0.1 C until a voltage was 0.01 V (vs Li), and was charged at a constant voltage until a current was 0.01 C. Then, each cell was rested for 10 minutes and discharged at a constant current of 0.1 C until a voltage was 1.5 V. Subsequently, in the second cycle, the cell was charged at a constant current of 0.2 C until a voltage was 0.01 V (vs Li), and was charged at a constant voltage until a current was 0.01 C. The charged cell was rested for 10 minutes, and then discharged at a constant current of 0.2 C until a voltage was 1.5 V.

Figure 7:
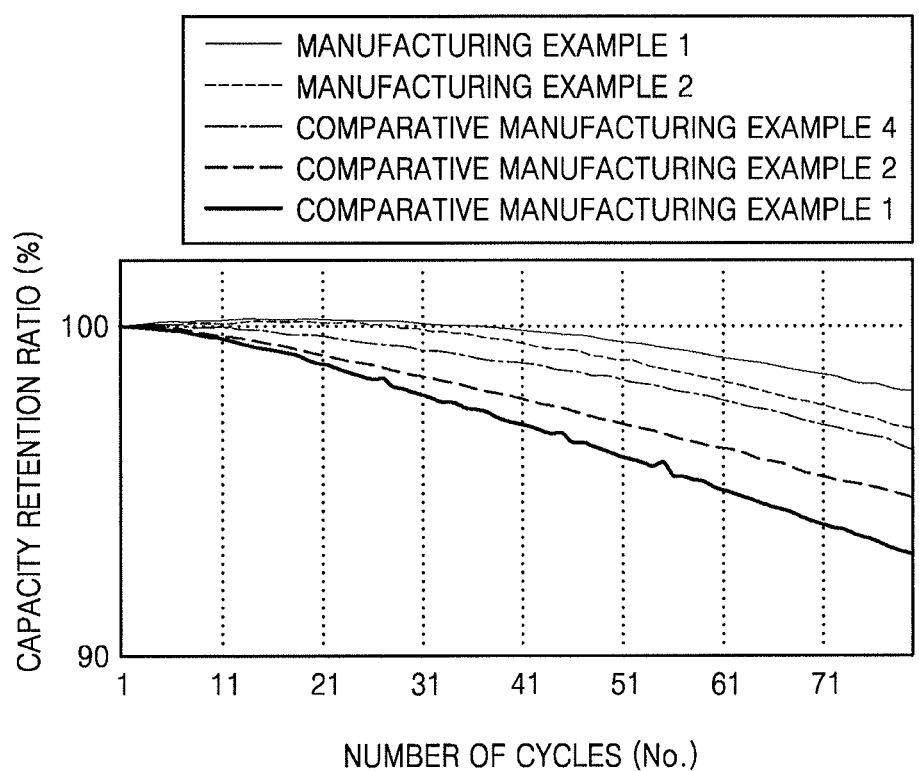
FIG. 7 illustrates change in capacity retention ratio of coin-half cells prepared in Manufacturing Example 1 and Comparative Manufacturing Examples 1 to 3 at room temperature.

The coin-half cell was charged at a constant current of 1 C until a voltage was 0.01 V (vs Li) and charged at a constant voltage until a current was 0.01 C. Then, the charged cell was rested for about 10 minutes, and the cell was discharged at a constant current of about 1.5 C until a voltage was 1.5 V, thereby completing one charging/discharging cycle. The lifespan evaluation was performed by performing 71 cycles of charging/discharging cycles. The results of the lifespan evaluation are shown in FIG. 7. A capacity retention ratio is calculated by using Equation 1.

Capacity retention ratio [%]=[71$^{st}$ cycle discharge capacity/1$^{st}$ cycle discharge capacity]×100  [Equation 1]

As shown in FIG. 6, a capacity retention ratio of the coin-half cell prepared in Manufacturing Example 1 at room temperature was improved compared to those of the coin-half cells prepared in Comparative Manufacturing Examples 2 and 4, and thus it may be known that the room temperature lifespan characteristics of the coin-half cell prepared in Manufacturing Example 1 was improved.

Also, capacity retention ratios of the coin-half cells of Manufacturing Examples 2 and 4 were evaluated in the same manner as used in evaluation of the capacity retention ratio of the coin-half cell prepared in Manufacturing Example 1. The capacity retention ratios of the coin-half cells of Manufacturing Examples 2 and 4 showed the similar results with the capacity retention ratio of the coin-half cell prepared in Manufacturing Example 1.

EVALUATION EXAMPLE 5

Initial Efficiency

The coin-half cells prepared in Manufacturing Examples 1 and 2 and Comparative Manufacturing Examples 1 and 4 were each charged/discharged at 0.1 C to perform 1 cycle of a formation process, and each cell underwent 1 cycle of charging/discharging at 0.2 C to confirm initial charging/discharging characteristics. The results are shown in Table 2.

At 25° C., the charging/discharging process was carried out such that the charging started at a constant current (CC) mode, and was set to be changed to a constant voltage (CV) mode which cut-off the current at a voltage of 4.3 V; and the discharging was set at a CC mode from a voltage of 2.75 V and to be cut-off at a voltage of 1.5 V.

An initial efficiency of the coin-half cells was calculated by using Equation 2.

Initial efficiency (%)=(1$^{st}$ cycle discharge capacity/1$^{st}$ cycle charge capacity)×100  [Equation 2]

TABLE 2

|  | Charging capacity(mAh) | Discharge capacity(mAh) | Efficiency (%) |
| --- | --- | --- | --- |
| Manufacturing Example 1 | 189.2 | 164.5 | 87.1 |
| Manufacturing Example 2 | 189.1 | 165.3 | 87.4 |
| Comparative Manufacturing Example 1 | 187.7 | 163.2 | 86.9 |
| Comparative Manufacturing Example 4 | 187.1 | 162.2 | 86.7 |

Referring to Table 2, initial efficiency characteristics of the coin-half cells prepared in Manufacturing Examples 1 and 2 were better than those of the coin-half cell prepared in Comparative Manufacturing Example 4. Also, when compared with the cell using the positive electrode active material of Comparative Manufacturing Example 1 having a coating layer on a lithium composite oxide, the coin-half cells of Manufacturing Examples 1 and 2 did not have initial efficiency deterioration caused by formation of a coating layer.

Also, initial efficiency characteristics of the coin-half cells prepared in Manufacturing Examples 3 and 4 were evaluated in the same manner as in the evaluation of the initial efficiency characteristics evaluation performed on the coin-half cells of Manufacturing Example 1. The initial efficiency characteristics of the coin-half cells of Manufacturing Examples 3 and 4 showed the similar results with the initial efficiency characteristics of the coin-half cell prepared in Manufacturing Example 1.

EVALUATION EXAMPLE 6

High-rate Discharge Characteristics (Rate-capability)

Each of the coin-half cells prepared in Manufacturing Example 1, Manufacturing Example 2, Comparative Manufacturing Example 1, and Comparative Manufacturing Example 4 was charged at a constant current of 0.1 C and a constant voltage of 1.0 V until a cut-off current of 0.01 C, rested for about 10 minutes, and then discharged under a condition of a constant current (at 0.2 C, 0.3 C, 0.5 C, or 1 C) until a voltage was 2.5 V. When the number of the charging/discharging cycle increased, the discharging rate was respectively increased to 0.2 C, 0.3 C, 0.5 C, and 1 C, and thus high-rate discharge characteristics (or a rate capability) of the coin-half cell were evaluated. The cell was discharged at a rate of 0.1 C at the first to third charging/discharging cycles. The high-rate discharge characteristics are shown in Table 3. Here, the rate capability is calculated by using Equation 3.

Rate capability (%)=(1 C discharge capacity)/(0.1 C discharge capacity)×100  [Equation 3]

TABLE 3

|  | Discharge capacity (mAh) (@0.2 C) | Discharge capacity (mAh) (@0.33 C) | Discharge capacity (mAh) (@0.5 C) | Discharge capacity (mAh) (@1.0 C) | Rate capability (%) (@1 C/ 0.1 C) |
| --- | --- | --- | --- | --- | --- |
| Manufacturing Example 1 | 159.9 | 156.5 | 153.2 | 146.6 | 88.9 |
| Manufacturing Example 2 | 161.0 | 157.3 | 154.1 | 148.1 | 89.8 |
| Comparative Manufacturing Example 1 | 158.4 | 154.6 | 151.1 | 144.9 | 88.8 |
| Comparative Manufacturing Example 4 | 158.1 | 154.4 | 151.4 | 145.4 | 89.6 |

Referring to Table 3, it may be shown that the rate capabilities of the coin-half cells prepared in Manufacturing Examples 1 and 2 were better than those of the coin-half cell prepared in Comparative Manufacturing Examples 1 and 4.

Also, high-rate discharge characteristics of the coin-half cells prepared in Manufacturing Examples 3 and 4 were evaluated in the same manner as in the evaluation of the high-rate discharge characteristics evaluation performed on the coin-half cell of Manufacturing Example 1. The rate discharge characteristics of the coin-half cells of Manufacturing Examples 3 and 4 showed the similar results with the rate discharge characteristics of the coin-half cell prepared in Manufacturing Example 1.

By way of summation and review, lithium cobalt oxide, lithium nickel oxide, or lithium manganese oxide may be used as a positive electrode active material of a lithium secondary battery. However, such positive electrode active materials may not provide a suitable safety level or lifespan characteristics and storage characteristics. Accordingly, improvements in positive electrode active materials is desirable.

The positive electrode active material according to embodiments may have a structure that includes a zirconium oxide ($ZrO_2$) coating layer on a surface of the lithium composite oxide and the lithium zirconium oxide ($Li_2ZrO_3$) coating layer on the zirconium oxide ($ZrO_2$) coating layer.

The outermost layer of the positive electrode active material according to embodiments may be the lithium zirconium oxide coating layer through which lithium ions may pass. The positive electrode active material may facilitate transfer of lithium ions and formation of a firm coating layer that is resistant to damage or destruction over time. When the positive electrode active material is used, electrolyte solution exposure to an electrode may be suppressed for a long time, and a side reaction between the electrode and the electrolyte solution may be effectively suppressed. Also, due to the presence of the coating layer, dissolving of a transition metal of the lithium composite oxide in the electrolyte solution may be reduced or prevented. When the positive electrode active material is used, a lithium secondary battery having improved capacity and efficiency characteristics may be manufactured.

Further, when the zirconium oxide coating layer is between the lithium composite oxide and the lithium zirconium oxide coating layer, reactions between unstable $Ni^{4+}$ and $Co^{4+}$, which are produced during charging, and HF, which is produced in the electrolyte, may be suppressed. The capacity and lifespan characteristics of a lithium secondary battery, as well as high-temperature storage characteristics of the battery, may be improved. When a positive electrode including the positive electrode active material is used, the lithium secondary battery including the positive electrode may have improved lifespan and safety characteristics.

In contrast, if a positive electrode active material has only a zirconium oxide ($ZrO_2$) coating layer on a surface of a lithium composite oxide, initial lifespan and storage characteristics of a lithium secondary battery including the positive electrode active material may be adequate, but as time elapses, a part of a coating layer may be destroyed by a side reaction with an electrolyte. Also, the positive electrode active material having only a zirconium oxide ($ZrO_2$) coating layer on a surface of a lithium composite oxide may have excellent Li ion conductivity characteristics, but its high-temperature storage characteristics may deteriorate.

As described above, a lithium secondary battery including a positive electrode that includes a positive electrode active material according to embodiments may have improved lifespan and safety characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode active material, comprising:
   a lithium composite oxide; and
   a zirconium oxide coating layer and a lithium zirconium oxide coating layer that are in a form of sequential layers on the lithium composite oxide, at least one of the zirconium oxide coating layer and the lithium zirconium oxide coating layer being directly on the lithium composite oxide.

2. The positive electrode active material as claimed in claim 1, wherein the lithium composite oxide is a compound represented by Formula 1:

$$Li_aNi_xCo_yMn_{1-x-y-z}M'_zO_2 \qquad \text{[Formula 1]}$$

wherein, in Formula 1, M' is at least one metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo) and tungsten (W); and
   $0.8 < a \leq 1.3$, $0 < x \leq 1$, $0 < y \leq 1$, $0 < z \leq 1$, and $x+y+z \leq 1$.

3. The positive electrode active material as claimed in claim 1, wherein an amount of the lithium zirconium oxide is in a range of about 0.05 mol % to about 5 mol % relative to the total molar amount of a transition metal of the lithium composite oxide.

4. The positive electrode active material as claimed in claim 1, wherein an amount of the zirconium oxide is in a range of about 0.05 mol % to about 5 mol % relative to the total molar amount of a transition metal of the lithium composite oxide.

5. The positive electrode active material as claimed in claim 1, wherein a thickness of the lithium zirconium oxide coating layer and a thickness of the zirconium oxide coating layer are each in a range of about 1 nm to about 20 nm.

6. The positive electrode active material as claimed in claim 1, wherein:
   the lithium zirconium oxide coating layer is a first lithium zirconium oxide coating layer that is directly on the lithium composite oxide, and the positive electrode active material further includes a second lithium zirconium oxide coating layer on the zirconium oxide coating layer, and
   the first lithium zirconium oxide coating layer has a thickness of about 5 nm or less.

7. A method of preparing a positive electrode active material for a lithium secondary battery, the method comprising:
   mixing and drying a lithium composite oxide, a zirconium precursor, and a solvent; and
   adding a lithium precursor to the resultant of the mixing and drying process, and
   heat-treating the resultant having the lithium precursor added thereto to prepare the positive electrode active material as claimed in claim 1.

8. The method as claimed in claim 7, wherein the heat-treating is performed at a temperature in a range of about 600° C. to about 900° C.

9. The method as claimed in claim 7, wherein an amount of the zirconium precursor is in a range of about 0.05 mol % to about 5 mol % relative to the total molar amount of a transition metal of the lithium composite oxide.

10. The method as claimed in claim 7, wherein an amount of the lithium precursor is in a range of about 0.01 part to about 2.0 parts by weight based on 100 parts by weight of the lithium composite oxide.

11. The method as claimed in claim 7, wherein the zirconium precursor is or includes zirconium acetylacetonate, zirconium hydroxide, zirconium carbonate, or zirconium acetate.

12. A lithium secondary battery, comprising a positive electrode active material, the positive active material including:
a lithium composite oxide; and
a zirconium oxide coating layer and a lithium zirconium oxide coating layer that are in a form of sequential layers on the lithium composite oxide, at least one of the zirconium oxide coating layer and the lithium zirconium oxide coating layer being directly on the lithium composite oxide.

13. The lithium secondary battery as claimed in claim 12, wherein the lithium composite oxide is a compound represented by Formula 1:

$$Li_aNi_xCo_yMn_{1-x-y-z}M'_zO_2 \quad \text{[Formula 1]}$$

wherein, in Formula 1, M' is at least one metal selected from boron (B), magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo) and tungsten (W); and
$0.8<a\leq1.3$, $0<x\leq1$, $0<y\leq1$, $0\leq z<1$, and $x+y+z\leq1$.

14. The lithium secondary battery as claimed in claim 12, wherein an amount of the lithium zirconium oxide is in a range of about 0.05 mol % to about 5 mol % based on a total amount of a transition metal of the lithium composite oxide.

15. The lithium secondary battery as claimed in claim 12, wherein an amount of the zirconium oxide is in a range of about 0.05 mol % to about 5 mol % relative to a total molar amount of a transition metal of the lithium composite oxide.

16. The lithium secondary battery as claimed in claim 12, wherein a thickness of the lithium zirconium oxide coating layer and a thickness of the zirconium oxide coating layer are each in a range of about 1 nm to about 20 nm.

17. The lithium secondary battery as claimed in claim 12, wherein:
the lithium zirconium oxide coating layer is a first lithium zirconium oxide coating layer that is directly on the lithium composite oxide, and the positive active material further includes a second lithium zirconium oxide coating layer being on the zirconium oxide coating layer, and
the first lithium zirconium oxide coating layer has a thickness of about 5 nm or less between the lithium composite oxide and the zirconium oxide coating layer.

* * * * *